(12) United States Patent
Ibrahim (10) Patent No.: US 8,913,724 B2
(45) Date of Patent: Dec. 16, 2014

(54) SYSTEM AND METHOD FOR AUTOMATIC ASSIGNMENT OF LOCAL PHONE NUMBER TO LONG DISTANCE PREPAID ACCOUNT

(71) Applicant: Majd Ibrahim, Stuart, FL (US)

(72) Inventor: Majd Ibrahim, Stuart, FL (US)

( * ) Notice: Subject to any disclaimer, the term of this patent is extended or adjusted under 35 U.S.C. 154(b) by 0 days.

(21) Appl. No.: 13/833,125

(22) Filed: Mar. 15, 2013

(65) Prior Publication Data

US 2014/0146955 A1    May 29, 2014

Related U.S. Application Data

(60) Provisional application No. 61/729,881, filed on Nov. 26, 2012.

(51) Int. Cl.
| | | |
|---|---|---|
| *H04M 15/00* | (2006.01) | |
| *H04M 3/22* | (2006.01) | |
| *H04M 17/00* | (2006.01) | |
| *H04M 3/42* | (2006.01) | |

(52) U.S. Cl.
CPC .............. *H04M 3/229* (2013.01); *H04M 17/10* (2013.01); *H04M 3/4228* (2013.01)
USPC ................... 379/114.2; 379/121.01; 379/122; 379/127.01; 379/127.06

(58) Field of Classification Search
CPC ... H04M 17/00; H04M 15/06; H04M 15/854; H04M 17/10; H04M 2215/018; H04M 2215/8066; H04M 3/42144; H04M 7/0081; H04W 4/24
USPC ............... 379/112.01, 114.17, 114.2, 115.01, 379/115.03, 121.01, 125, 221.01, 221.02, 379/122, 127.01, 127.06; 455/414.1, 415, 455/417, 428, 432.3

See application file for complete search history.

(56) References Cited

U.S. PATENT DOCUMENTS

| | | | | |
|---|---|---|---|---|
| 7,042,994 | B2 * | 5/2006 | Hanna et al. | 379/121.02 |
| 7,372,949 | B1 * | 5/2008 | Kurth et al. | 379/196 |
| 7,539,294 | B2 * | 5/2009 | Moon et al. | 379/114.2 |
| 7,894,587 | B1 * | 2/2011 | Laurinavichus | 379/207.14 |
| 8,355,492 | B1 * | 1/2013 | Polozola et al. | 379/211.02 |
| 8,532,274 | B2 * | 9/2013 | Caipa et al. | 379/114.2 |
| 2001/0028705 | A1 * | 10/2001 | Adams et al. | 379/114.2 |
| 2004/0213391 | A1 * | 10/2004 | Yau et al. | 379/114.01 |
| 2009/0016519 | A1 * | 1/2009 | Bedingfield et al. | 379/216.01 |
| 2010/0227604 | A1 * | 9/2010 | Hsieh | 455/418 |
| 2012/0134486 | A1 * | 5/2012 | Caipa et al. | 379/221.02 |

* cited by examiner

*Primary Examiner* — Binh Tieu
(74) *Attorney, Agent, or Firm* — Lott & Fischer, PL (57) ABSTRACT

A method for assigning an alias telephone number to a long distance telephone number in connection with a pre-paid account, comprising obtaining from a user an account number, a long distance number and an originating call number; comparing said account number and long distance number against an alias number database to confirm that no local alias number has been assigned to said long distance number and account number combination; identifying from a pool of available local alias numbers a local alias number having the same area code, or an area code from the same calling area, as said originating telephone number; associating said available local alias number with said long distance number, said account number, and said originating telephone number; and sending a message to said user advising of the association of said local alias number with said long distance number, said call's originating telephone number, and said account number.

6 Claims, 7 Drawing Sheets

SYSTEM AND METHOD FOR AUTOMATIC ASSIGNMENT OF LOCAL PHONE NUMBER TO LONG DISTANCE PREPAID ACCOUNT

CLAIM OF PRIORITY

This application is being filed as a non-provisional patent application under 35 U.S.C. §111(b) and 37 CFR §1.53(c). This application claims priority under 35 U.S.C. §111(e) to U.S. provisional patent application Ser. No. 61/729,881, filed Nov. 26, 2012, the contents of which are incorporated herein by reference.

FIELD OF INVENTION

The present invention relates to telecommunications. More particularly, the present invention relates to a system for, and method of, automatic assignment of a local telephone number "alias" to a long distance telephone number dialed by the user of a prepaid long distance account.

BACKGROUND OF THE INVENTION

Pre-paid long distance accounts have become ubiquitous in the United States and around the world. In particular, pre-paid long distance accounts are used by individuals who have travelled from a foreign country, or have relatives, acquaintances or business associates in a foreign country, and have a need for frequent long distance telephone communications the foreign country. Such individuals, for a variety of reasons, are generally not able to, or may not desire to, establish a traditional "land line" telephone account or a contract with a long distance carrier.

Such relationships, for example, usually require credit histories and long-established presence in the country where the account is being set up. In addition, certain long distance callers are concerned with privacy and prefer to make payments for long distance accounts using cash, something that is generally not available in a traditional long distance account. Moreover, establishing a land line may require a permanent residential address which is difficult, if not impossible, for individuals who are only temporarily in the country where the account is being established.

To service these types of customers, many telecommunications providers purchase long distance minutes from international carriers at wholesale prices and re-sell them to their customers, primarily through pre-paid long distance accounts. Pre-paid long distance accounts, require advance payment from the user, which payment is credited to the user account for later use to make telephone calls. Because these accounts are prepaid, credit checks and residential addresses are not necessary, and cash payments are commonly accepted.

The traditional pre-paid account provides to the user, in exchange for a pre-payment which is credited to the user's account, a provider access telephone number (or "local access" number) with a local or toll-free area code, and account number and a (optionally for additional security) personal identification number ("PIN"), the last two being unique to the user. More recently, "pinless" systems have become common in which instead of using a PIN, the system is able to confirm that the correct user is utilizing the account by decoding the caller's originating number through use of the caller identification ("Caller-ID" or "CID") service.

In order to initiate a call using a traditional pre-paid account, the user dials the provider access number, when prompted keys in (or speaks) the account number and PIN (or optionally the caller's Caller-ID number is decoded), and, upon verification of the user's available balance of minutes or dollars, the user is prompted to enter the long distance phone number that the user wishes to dial. The long distance call is then placed by the provider and the user is switched out of the provider access circuit and on to the long distance call. At the conclusion of the call, or sometimes in real-time during the call, the user's account is charged by deducting minutes or dollars.

Of course, if at the outset of the call the user does not have a sufficient minimum balance to place the call, the provider may refuse to place the call until the user replenishes the account with sufficient funds. Similarly, if the user runs out of credits during the call, the call may be disconnected or temporarily placed on hold while the user replenishes the account.

Although these accounts resolve the need for having traditional accounts with long distance carriers, they come at a cost in loss of convenience. To wit, rather than simply dialing the desired long distance number, the user must dial the access number, account number and (optionally) PIN, in addition to the long distance number. Not only are there many numbers to dial but the user often may not remember the numbers and may have to refer to notes or cards to recall them.

What's more, because making the call requires interaction with operators or automated response systems, it is often impossible to program the user's phone's "speed dial" feature to automatically enter the digits. This means that the user must memorize the long distance number or rely on an address book to recall the number.

Accordingly, it would be beneficial for a user to assign a local "alias" number to an often-dialed long distance number. Assignment of a local alias number could provide convenience if the pre-paid long distance system were able to automatically recognize, from the alias number dialed, the account from which the call was originating and the long distance number to be dialed. Such a system would not require the user to dial account numbers, PINs or long distance numbers. In addition, the alias number could be stored as a speed dial number by the user and enjoy a much greater level of convenience. The experience would, in fact, be nearly identical to making a local telephone call, while enjoying all the benefits of a pre-paid long distance account.

In addition to providing convenience, such a system would streamline the pre-paid account providers operations because the caller would only be required to be on the provider access circuit for a very short time before being switched to the long distance call. This would, in turn, significantly increase the provider's capacity to handle calls without requiring any additional provider access lines as well as reduce the costs for the operator who pays for such lines based on use by its customers.

Another benefit of such a system would be to significantly reduce the number of misdialed long distance calls. Many providers refund customers for misdialed calls and their avoidance can translate into to better network efficiency, quality of service and a cost saving to the provider and customer.

The assignment of local "alias" numbers to correspond to long distance numbers has been previously attempted. However, it has not met with commercial success because the process of assigning aliases has traditionally been complicated, often requiring a personal computer or computer terminal, internet access and/or a human operator to effect. The present invention resolves these problems by providing a system that automatically assigns local "alias" numbers to long distance numbers for pre-paid accounts without any additional input or interaction from the user or an operator and without the need of a personal computer or a computer terminal, or access to the internet.

These and other objects, features, and advantages of the present invention may be more clearly understood and appreciated from a review of ensuing detailed description of the preferred and alternate embodiments and by reference to the accompanying drawings and claims.

SUMMARY OF THE INVENTION

In one embodiment of the present invention, provided is a method for assigning a local alias telephone number to a long distance telephone number in connection with a pre-paid account, comprising the steps of accepting a call from an existing user of the pre-paid account; obtaining said call's originating telephone number using the Caller-ID service; prompting the user to enter the long distance number to dial; either prompting a user to enter a pre-paid account number or identifying a prepaid account number from the originating telephone number and user account records; storing said pre-paid account number, long distance number and originating number; comparing said pre-paid account number and long distance number against an alias number database to confirm that no local alias number has been assigned to said long distance number and pre-paid account number combination; upon said confirmation, identifying from a pool of available local alias numbers a local alias number having the same area code, or an area code from the same calling area, as said originating telephone number; associating said available local alias number with said long distance number, said pre-paid account number, and said originating telephone number, and entering one or more records denoting said association in said alias number database; and sending a message to said user advising of the association of said local alias number with said long distance number, said call's originating telephone number, and said pre-paid account number.

In another embodiment of the present invention, provided is a method for assigning a local alias telephone number to a long distance telephone number in connection with a pre-paid account, comprising the steps of accepting an International Mobile Top Up transaction from a user of the pre-paid account, prompting the user to enter pre-paid account number and long distance number to top up, and receiving from the user said pre-paid account number and long distance number; identifying a user local telephone number for said user from records maintained in connection with said pre-paid account; storing said pre-paid account number, long distance number and user local telephone number; comparing said pre-paid account number and long distance number against an alias number database to confirm that no local alias number has been assigned to said long distance number and pre-paid account number combination; upon said confirmation, identifying from a pool of available local alias numbers a local alias number having the same area code, or an area code from the same calling area, as said user local number; associating said available local alias number with said long distance number, said pre-paid account number, and said user local telephone number, and entering one or more records denoting said association in said alias number database; and sending a message to said user advising of the association of said local alias number with said long distance number and said pre-paid account number.

In another embodiment of the present invention, provided is a method for assigning a local alias telephone number to a long distance telephone number in connection with a pre-paid account, comprising the steps of receiving a message from an existing user of the pre-paid account, said message including said pre-paid account's number and a long distance number; identifying a user local number for said user from records maintained in connection with said pre-paid account; storing said pre-paid account number, long distance number and user local number; comparing said pre-paid account number and long distance number against an alias number database to confirm that no local alias number has been assigned to said long distance number and pre-paid account number combination; upon said confirmation, identifying from a pool of available local alias numbers a local alias number having the same area code, or an area code from the same calling area, as said user local number; associating said available local alias number with said long distance number, said pre-paid account number, and said user local telephone number, and entering one or more records denoting said association in said alias number database; and sending a message to said user advising of the association of said local alias number with said long distance number and said pre-paid account number.

BRIEF DESCRIPTION OF THE DRAWINGS

Various exemplary embodiments of the present invention will now be described in detail, wherein like reference numerals refer to identical or similar components or steps, with reference to the following figures. Likewise, some of the figures herein depict minimal line-work for ease of understanding.

It should be understood at the outset that some of the functions in connection with the disclosed invention are performed in software especially adapted to perform such functions. Although said software is customized to perform these functions, the ability to write said software in a virtually infinite variety of ways is well within the capabilities of persons having ordinary skill in the art once they understand the methods described in this application. Similarly, many of the functions described in this application require the ability to accept, transfer, switch and decode communications sent over telecommunications equipment. The equipment necessary for these functions is well understood by persons having ordinary skill in the art and includes not only standard analog telecommunications equipment (such as equipment compatible with the public switched telephone network ("PSTN")) but also more modern digital telecommunications technology such as VoIP and the like.

DETAILED DESCRIPTION OF THE INVENTION

While the present invention will be described more fully hereinafter with reference to the accompanying drawings, in which a number of embodiments of the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1A:
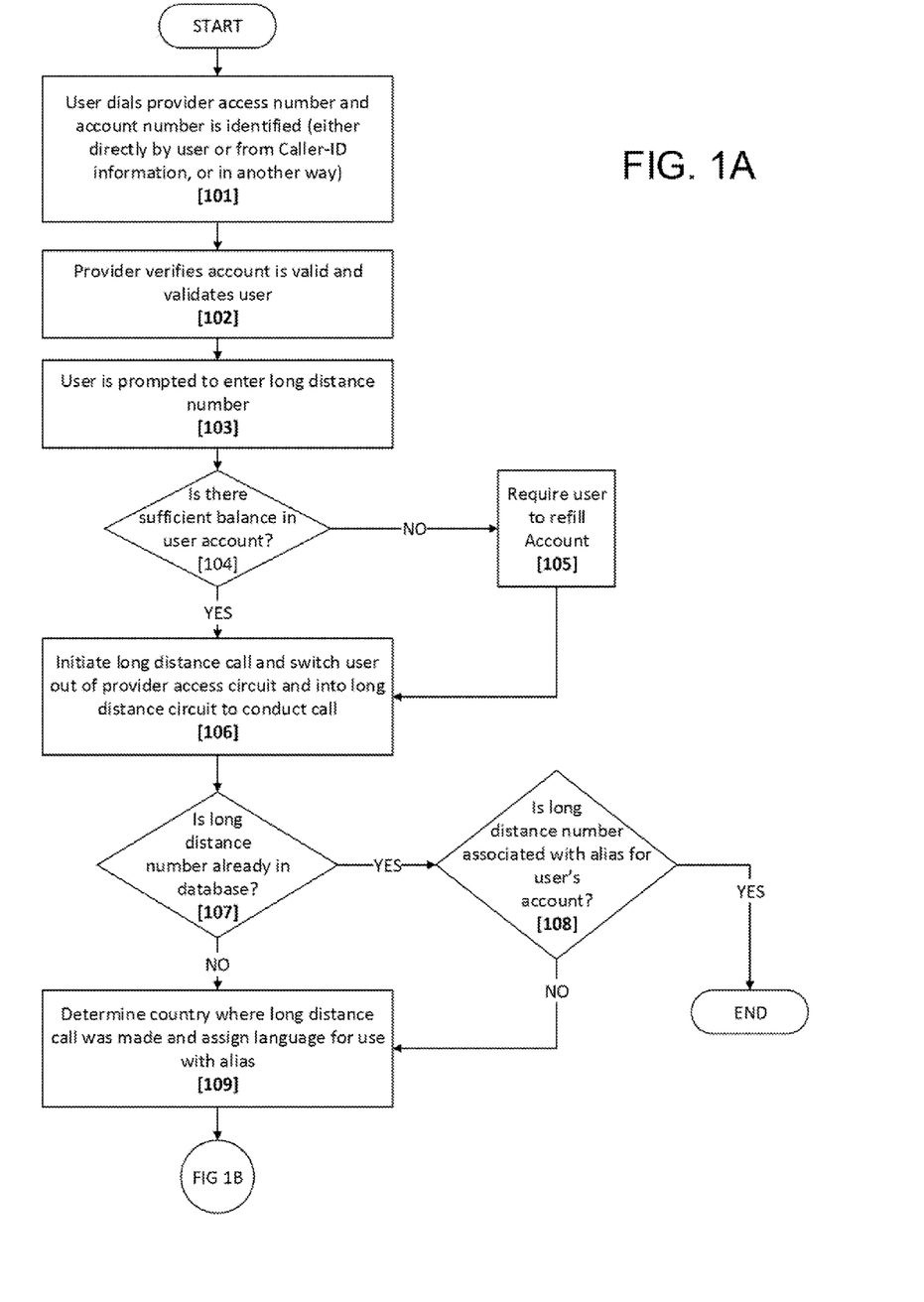
FIGS. 1A and 1B illustrate a flowchart representing the steps in one embodiment of the present invention in which the long distance number and user account information are obtained when the user makes a traditional call using a pre-paid account.

Referring first to FIG. 1A, in a first embodiment of the present invention, the first time a user makes a call to a particular long distance telephone number, the call is handled in the usual manner. The user dials the local access number and is prompted for the account number and PIN [101]. Alternatively, the user account number may be identified from Caller-ID data decoded by the provider and cross-referenced to account records. The provider verifies that the user account is valid and checks that the provided PIN (or Caller-ID number or other type of authentication indicia) matches the account number identified [102]. Once the account is verified, the user is prompted to enter the long distance number to be dialed [103].

The system then queries the user's account to verify that there is a sufficient credit balance to make the long distance call [104]. If there isn't sufficient credit, the user is required to replenish the account before proceeding [105]. Once a sufficient credit balance is established, the long distance call is placed and the user is switched from the provider access circuit to the long distance circuit to carry on with the long distance call [106].

Once the user is switched to the long distance call, the provider's system accesses the provider's alias number database to verify that no previous alias is associated with the just-dialed long distance number [107]. If the long-distance number is located in the alias number database, the system next checks whether the alias assigned to the number is also assigned to the user's account [108]. If the long distance number is associated to the user account, the process ends as the number is already associated with an alias assigned to the user's account.

It should be pointed out here that although the alias number database could have a more complicated structure, at its simplest it could consist of a lookup table having three values for each record: (1) the long distance number; (2) the user account number; and (3) the assigned alias number. The process for creation, lookup and editing of such a database is well within the capabilities of a person having ordinary skill in the relevant art and is therefore not described herein in detail.

If the long distance number is either not found at all in the alias number database, or is found in the database but is assigned to a different user account, the provider's system then makes a determination of the country where the call was made to and assigns, based on that country, a language to be used in communicating with the user in connection with the alias number assignment [109]. The country lookup is easily accomplished through a lookup table associating international dialing codes with particular languages.

Figure 1B:
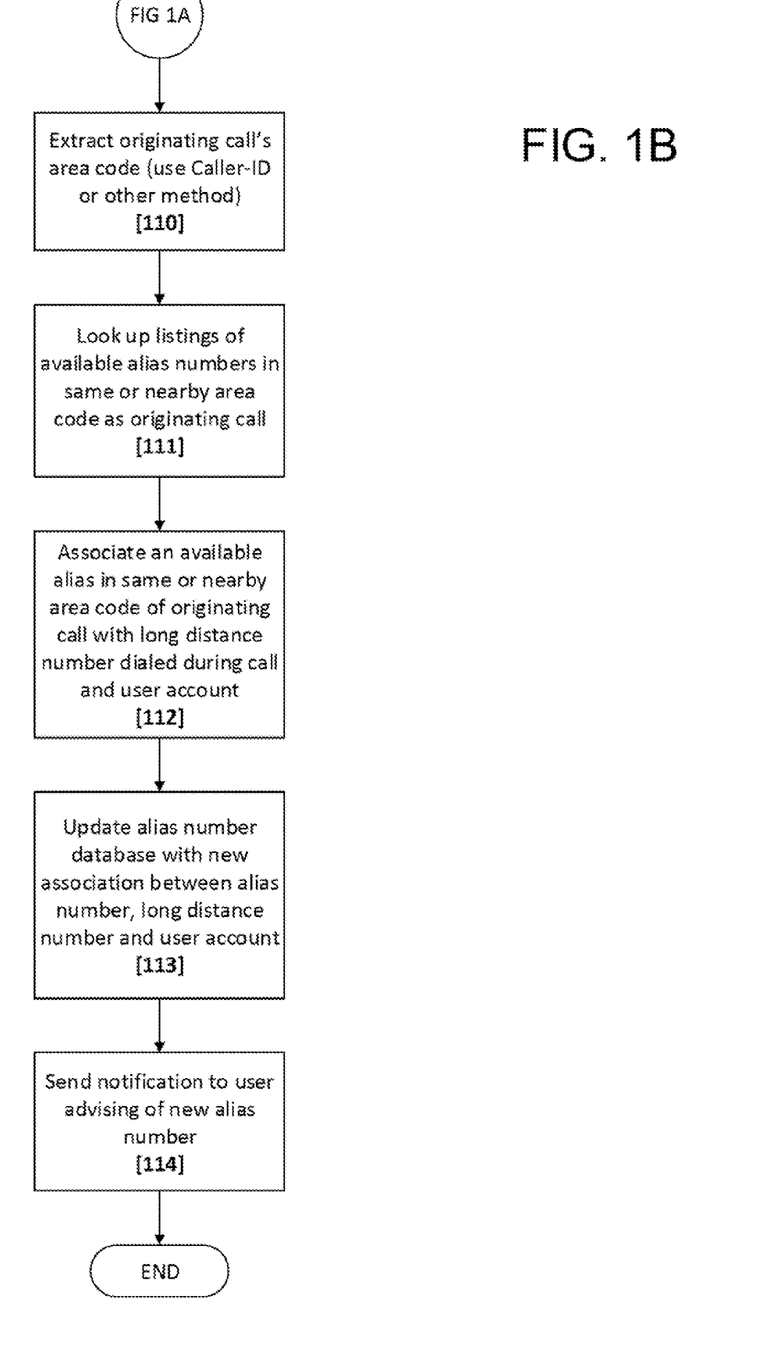

Continuing next to FIG. 1B, the provider's system next determines the user's originating area code [110]. Most commonly, this will be accomplished by extracting the area code from the Caller-ID information obtained in step [102]. However, the user's originating area code could be obtained from user account records or preferences chosen by the user and stored in such records.

The provider's system next looks up, from its list of available alias telephone numbers (numbers that have been previously assigned to the provider by the telephone company), an alias numnber with the same area code as the user's originating area code, or within the same calling area [111] and associates the alias number with the user and the long distance number [112]. If no such alias exists, the user may be assigned an alias in a nearby calling area or in a toll-free area. The alias number association is then written to the alias number database [113] as a new record containing (1) the long distance number; (2) the user account number; and (3) the assigned alias number. Of course, as indicated above, if the alias number database is more complicated (e.g., if it is a relational database having multiple tables) then the association can be recorded by duly updating the relevant tables and relations within the database.

Finally, once the association has been recorded in the alias number database, a notification message, providing the associated alias number with the long distance number and dialing instruction, is prepared in the previously noted language and is forwarded to the user by means of e-mail, short messaging service (SMS), land mail, voice mail, or any other suitable means [114].

It should be noted here that a particular alias number may optionally be assigned to multiple long distance numbers as long as the alias number is not associated twice with the same user account. As explained below, at the time a user makes a call using the alias number, the system verifies the originating number of the call using Caller-ID which, in turn, notifies the system of the user account associated with the Caller-ID to ensure that the correct long distance number is dialed out.

Figure 2A:
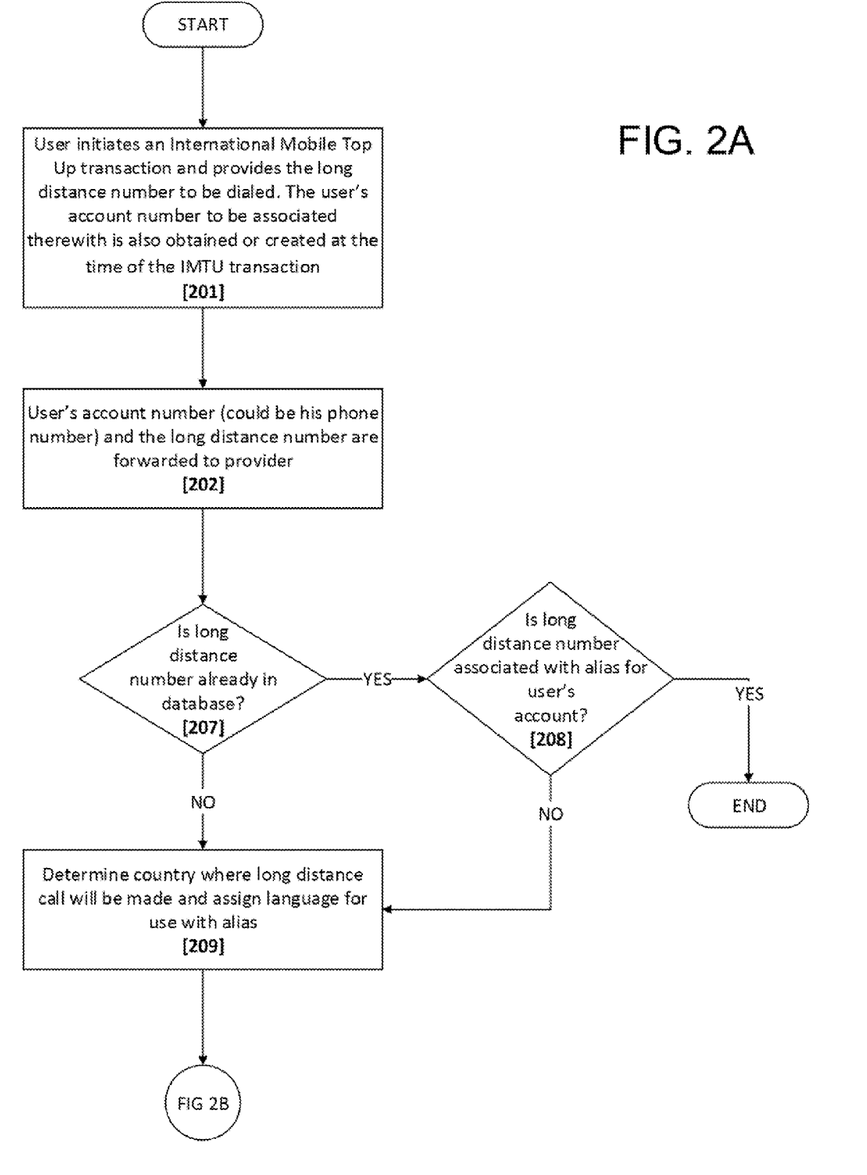
FIGS. 2A and 2B illustrate a flowchart representing steps in another embodiment of the present invention in which the long distance number and user account information are obtained when the user initiates an "International Mobile Top Up" transaction.
Figure 2B:
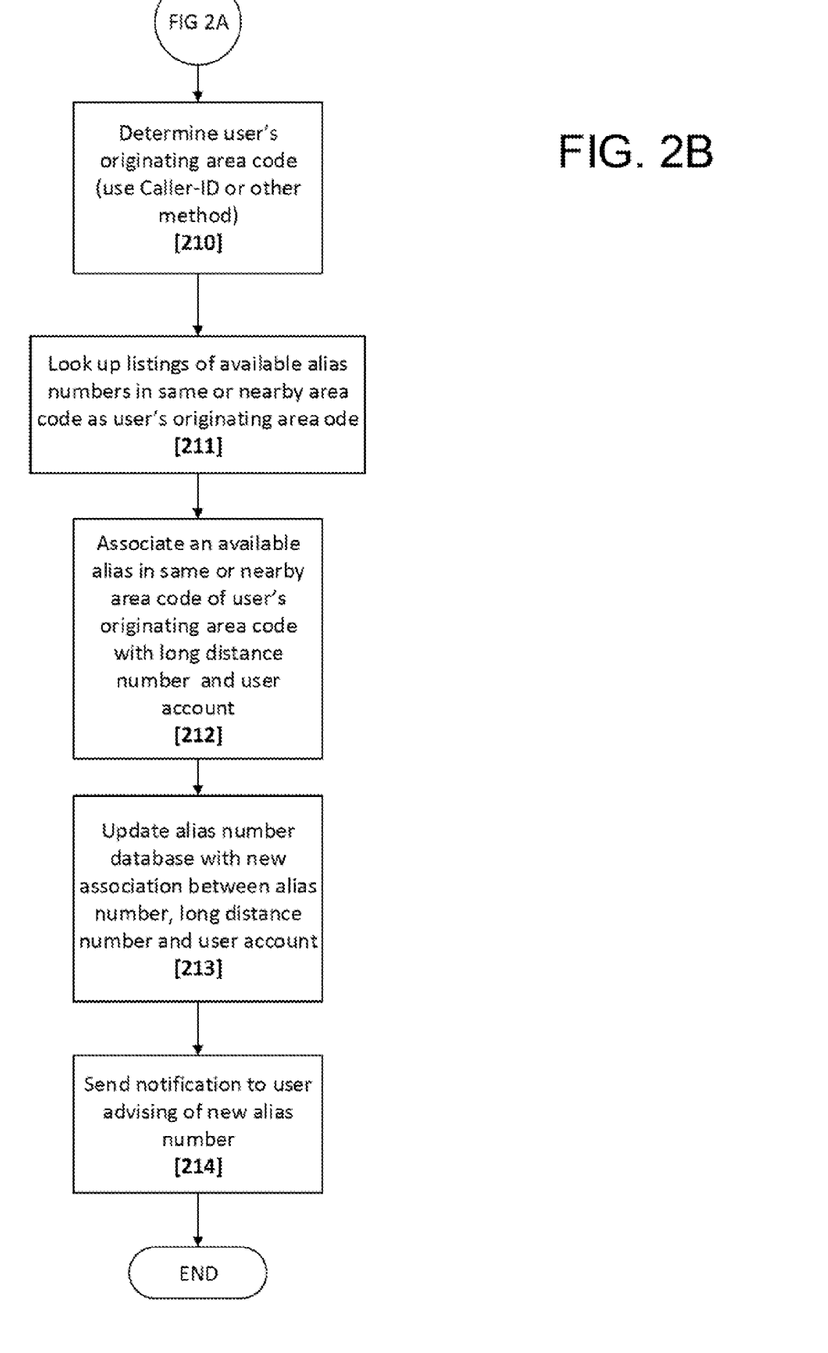

Referring next to FIGS. 2A and 2B, an additional embodiment of the present invention is provided whereby the user account and long distance numbers to be associated with an alias are not obtained through a telephone call, but rather when the user "tops up", or adds a credit to long distance account other than his own, a process known as an "International Mobile Top Up" transaction ("IMTU.") This embodiment is essentially the same as the initial embodiment, except that initial steps [201] through [202] replace the corresponding steps [101]-[106] of the first embodiment.

Referring to FIG. 2A, upon completion of the IMTU [201], the user or an agent for the provided (e.g. at a retail location) forwards to provider a request to create an alias association and included the IMTU's long distance number and the user's account number [202].

It should be pointed out that the user may or may not already have an existing account at the time the IMTU transaction is performed. If the user does not have an existing account, the account is created on the spot. It is also foreseen that the user's telephone number may also serve as the account number.

Having received the request, user account number and long distance number, the provider's system accesses the provider's alias number database to verify that no previous alias is associated with the long distance number [207]. If the long-distance number is located in the alias number database, the system next checks whether the alias assigned to the number is also assigned to the user's account [208]. If the long distance number is associated to the user account, the process ends as the number is already associated with an alias assigned to the user's account.

If the long distance number is either not found at all in the alias number database, or is found in the database but is assigned to a different user account, the provider's system then makes a determination of the country where the call was made to and assigns, based on that country, a language to be used in communicating with the user in connection with the alias number assignment [209].

Continuing next to FIG. 2B, the provider's system next determines the user's originating area code [210]. The user's originating area code can be obtained from user account records or preferences chosen by the user and stored in such records.

The provider's system next looks up, from its list of available alias telephone numbers (numbers that have been previously assigned to the provider by the telephone company), an alias number with the same area code as the user's originating area code, or within the same calling area [211] and associates the alias number with the user and the long distance number [212]. If no such alias exists, the user may be assigned an alias in a nearby calling area or in a toll-free area. The alias number association is then written to the alias number database [213] as a new record.

Finally, once the association has been recorded in the alias number database, a notification message, providing the associated alias number with the long distance number and dialing instruction, is prepared in the previously noted language and is forwarded to the user by means of e-mail, short messaging service (SMS), land mail, voice mail, or any other suitable means [214].

Figure 3A:
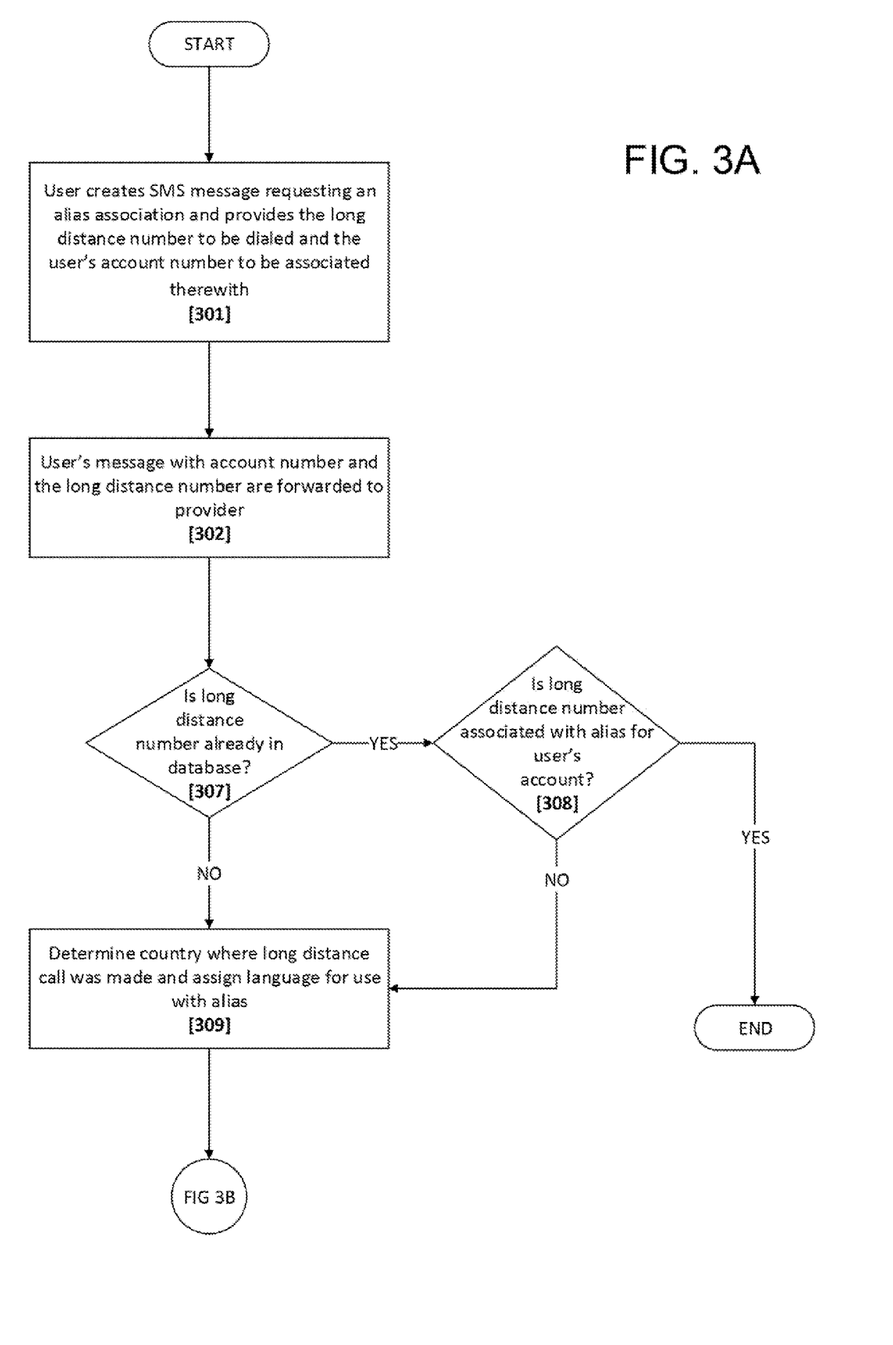
FIGS. 3A and 3B illustrate a flowchart representing the steps in another embodiment of the present invention in which the long distance number and user account information are obtained when the user transmits the information through an SMS message.
Figure 3B:
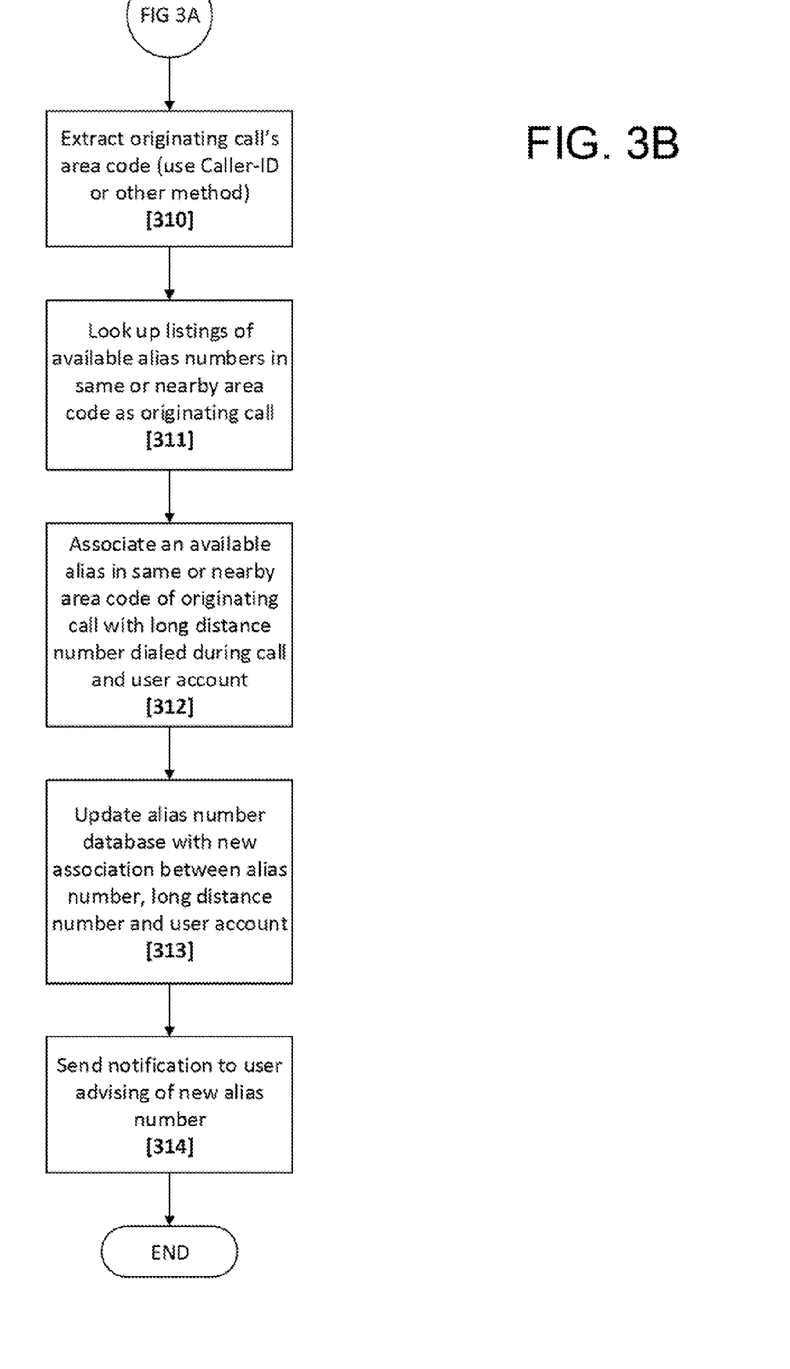

Referring next to FIGS. 3A and 3B, an additional embodiment of the present invention is provided whereby the user account and long distance numbers to be associated with an alias are not obtained through a telephone call, but rater from a message sent directly by the user to the provider requesting that the association be established. This embodiment is essentially the same as the initial embodiment, except that initial steps [301] through [302] replace the corresponding steps [101]-[106] of the first embodiment.

Referring to FIG. 3A, the user creates a message containing the user's account number and the long distance number with a request to generate an alias number [301] and sends it using the user's mobile phone as an SMS message. The message is received by the provider [302].

Once the provider receives the user's message and request, the provider's system accesses the provider's alias number database to verify that no previous alias is associated with the long distance number [307]. If the long-distance number is located in the alias number database, the system next checks whether the alias assigned to the number is also assigned to the user's account [308]. If the long distance number is associated to the user account, the process ends as the number is already associated with an alias assigned to the user's account.

If the long distance number is either not found at all in the alias number database, or is found in the database but is assigned to a different user account, the provider's system then makes a determination of the country where the long distance number belongs to and assigns, based on that country, a language to be used in communicating with the user in connection with the alias number assignment [309]. The country lookup is easily accomplished through a lookup table associating international dialing codes with particular languages.

Continuing next to FIG. 3B, the provider's system next determines the user's originating area code [310]. Most commonly, this will be accomplished by extracting the area code from the Caller-ID information taken from the SMS message that initiates the process. However, the user's originating area code could be obtained from user account records or preferences chosen by the user and stored in such records.

The provider's system next looks up, from its list of available alias telephone numbers (numbers that have been previously assigned to the provider by the telephone company), an alias number with the same area code as the user's originating area code, or within the same calling area [311] and associates the alias number with the user and the long distance number [312]. If no such alias exists, the user may be assigned an alias in a nearby calling area or in a toll-free area. The alias number association is then written to the alias number database [313] as a new record.

Finally, once the association has been recorded in the alias number database, a notification message, providing the associated alias number with the long distance number and dialing instruction, is prepared in the previously noted language and is forwarded to the user by means of e-mail, short messaging service (SMS), land mail, voice mail, or any other suitable means [314].

Figure 4:
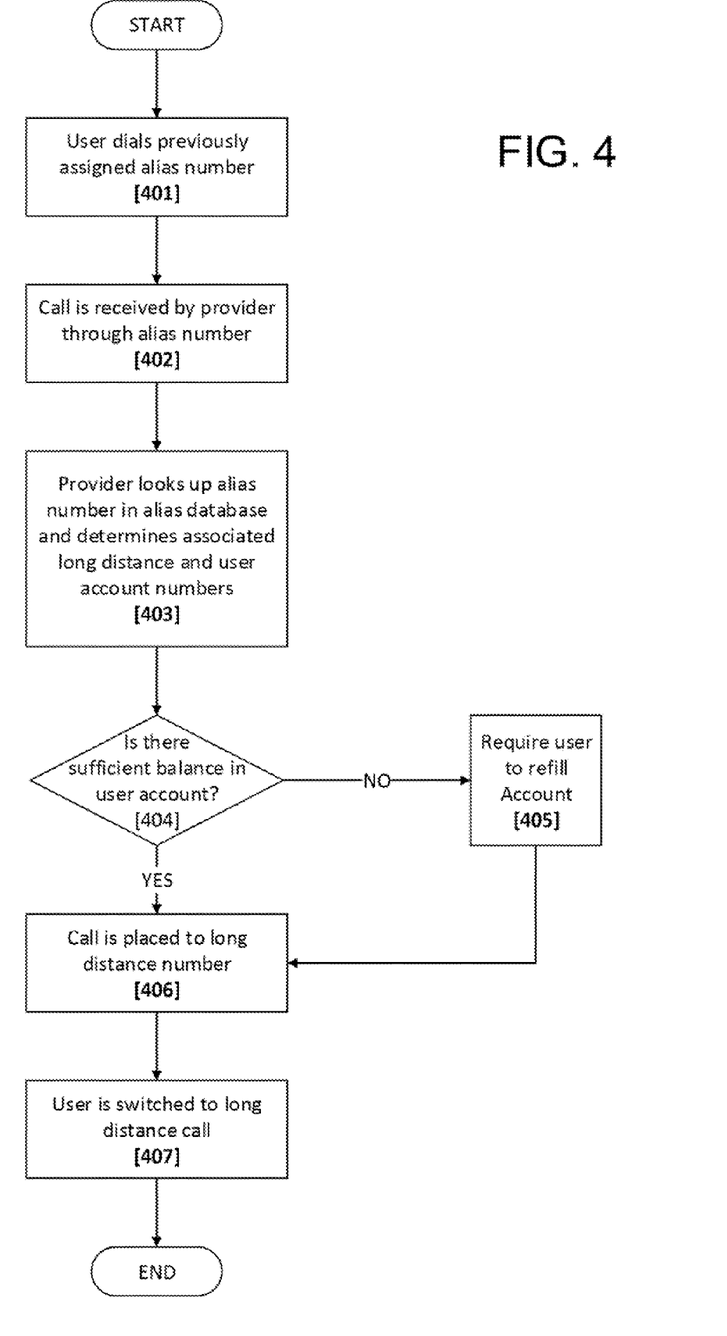
FIG. 4 illustrates a flowchart representing the steps to connect a call directed at an alias number established in accordance with the present invention.

Referring next to FIG. 4, from this point forward, after creating the association, using any of the above embodiments, between the alias number, the long distance number and the user's account, when the user dials the alias number [401], the call is automatically routed to the provider's local access network [402]. The system instantaneously determines the call's originating number through the Caller-ID service or a similar method and obtains the account number from the user's records. The system then looks up the long distance number associated with the alias number and account number in its alias number database [403], determines that a sufficient balance is available in the account [404], initiates the long distance call [406] and switches the user out of the local access network and on to the long distance call once the connection is established [407]. All of this is performed without any input from the user other than dialing the local "alias" number.

Accordingly, it will be understood that several embodiments of the present invention have been disclosed by way of example and that other modifications and alterations may occur to those skilled in the art without departing from the scope and spirit of the appended claims.

I claim:

1. A method for assigning a local alias telephone number to a long distance telephone number in connection with a pre-paid account, comprising the steps of:
   accepting a call from an existing user of the pre-paid account;
   obtaining said call's originating telephone number using the Caller-ID service;
   prompting the user to provide said long distance number;
   obtaining a pre-paid account number corresponding to said user;
   comparing said pre-paid account number and long distance number against an alias number database to confirm that no local alias number has been assigned to said long distance number and pre-paid account number combination;
   upon said confirmation, identifying from a pool of available local alias numbers a local alias number having the same area code, or an area code from the same calling area, as said originating telephone number;
   associating said available local alias number with said long distance number, said pre-paid account number, and said originating telephone number, and entering one or more records denoting said association in said alias number database; and
   sending a message to said user advising of the association of said local alias number with said long distance number, said call's originating telephone number, and said pre-paid account number.

2. A method in accordance with claim 1 for assigning a local alias telephone number to a long distance telephone number in connection with a pre-paid account, and completing a call to said long distance telephone number using said local alias telephone number, comprising the further steps of:

receiving from said user a second call from said local alias number and obtaining said second call's originating telephone number using the Caller-ID service, obtaining, using said second call's originating telephone number, said pre-paid account number from records maintained in connection with said pre-paid account;

looking up said local alias number and pre-paid account number in said alias number database and identifying an associated long distance number, initiating a call to said associated long distance number and connecting said user with said call.

3. A method for assigning a local alias telephone number to a long distance telephone number in connection with a pre-paid account, comprising the steps of:

accepting an International Mobile Top Up transaction from a user of the pre-paid account;

obtaining the pre-paid account number and long distance number to top up;

identifying a user local telephone number for said user from records maintained in connection with said pre-paid account;

comparing said pre-paid account number and long distance number against an alias number database to confirm that no local alias number has been assigned to said long distance number and pre-paid account number combination;

upon said confirmation, identifying from a pool of available local alias numbers a local alias number having the same area code, or an area code from the same calling area, as said user local number;

associating said available local alias number with said long distance number, said pre-paid account number, and said user local telephone number, and entering one or more records denoting said association in said alias number database; and sending a message to said user advising of the association of said local alias number with said long distance number and said pre-paid account number.

4. A method in accordance with claim 3 for assigning a local alias telephone number to a long distance telephone number in connection with a pre-paid account, and completing a call to said long distance telephone number using said local alias telephone number, comprising the further steps of:

receiving from said user a call from said local alias number and obtaining said call's originating telephone number using the Caller-ID service, obtaining, using said call's originating telephone number, said pre-paid account number from records maintained in connection with said pre-paid account;

looking up said local alias number and pre-paid account number in said alias number database and identifying an associated long distance number, initiating a call to said associated long distance number and connecting said user with said call.

5. A method for assigning a local alias telephone number to a long distance telephone number in connection with a pre-paid account, comprising the steps of:

receiving a message from an existing user of the pre-paid account, said message including said pre-paid account's number and a long distance number;

identifying a user local number for said user from records maintained in connection with said pre-paid account;

comparing said pre-paid account number and long distance number against an alias number database to confirm that no local alias number has been assigned to said long distance number and pre-paid account number combination;

upon said confirmation, identifying from a pool of available local alias numbers a local alias number having the same area code, or an area code from the same calling area, as said user local number;

associating said available local alias number with said long distance number, said pre-paid account number, and said user local telephone number, and entering one or more records denoting said association in said alias number database; and sending a message to said user advising of the association of said local alias number with said long distance number and said pre-paid account number.

6. A method in accordance with claim 4 for assigning a local alias telephone number to a long distance telephone number in connection with a pre-paid account, and completing a call to said long distance telephone number using said local alias telephone number, comprising the further steps of:

receiving from said user a call from said local alias number and obtaining said call's originating telephone number using the Caller-ID service, obtaining, using said call's originating telephone number, said pre-paid account number from records maintained in connection with said pre-paid account;

looking up said local alias number and pre-paid account number in said alias number database and identifying an associated long distance number, initiating a call to said associated long distance number and connecting said user with said call.

\* \* \* \* \*